United States Patent [19]

Swenson, Sr.

[11] Patent Number: 5,259,269
[45] Date of Patent: Nov. 9, 1993

[54] FLYWHEEL WITH ADJUSTABLE WEIGHTS

[76] Inventor: Roger M. Swenson, Sr., Rte. #2, Box 49A, Williamsville, Mo. 63967

[21] Appl. No.: 505,444

[22] Filed: Apr. 3, 1990

[51] Int. Cl.$^5$ ............................................. F16F 15/22
[52] U.S. Cl. .................................................. 74/573 R
[58] Field of Search .................. 74/603, 604, 573 R, 74/574, 443; 411/187; 403/258, 262, 1, 4, 243; 384/275, 282, 296, 416

[56] References Cited

U.S. PATENT DOCUMENTS

| | | | |
|---|---|---|---|
| 1,941,768 | 1/1934 | Vigne | 384/282 |
| 2,038,027 | 4/1936 | Edwards | 74/604 |
| 2,322,788 | 6/1943 | Clements | 74/604 X |
| 2,543,447 | 2/1951 | Elrod, Jr. | 74/573 |
| 2,610,524 | 9/1952 | Maust | 74/603 |
| 2,719,438 | 10/1955 | Schiefer . | |
| 2,722,049 | 11/1955 | Turlay | 74/603 X |
| 2,808,736 | 10/1957 | Jackson | 74/604 |
| 3,953,089 | 4/1976 | Dainin | 384/296 X |
| 4,210,234 | 7/1980 | Jones . | |
| 4,309,139 | 1/1982 | Nakae | 411/187 |
| 4,317,388 | 3/1982 | Wojcikowski . | |
| 4,462,269 | 7/1984 | Inglis . | |
| 4,538,481 | 9/1985 | Ohta et al. . | |
| 4,591,041 | 5/1986 | Valier . | |
| 4,594,917 | 6/1986 | Ziegler . | |
| 4,617,884 | 10/1986 | Allen et al. . | |
| 4,676,121 | 6/1987 | Kouno . | |
| 4,754,857 | 7/1988 | Urban | 403/4 X |
| 4,782,718 | 11/1988 | Hartig et al. . | |
| 4,782,936 | 11/1988 | Bopp . | |
| 4,791,829 | 12/1988 | Fukushima et al. . | |
| 4,803,893 | 2/1989 | Bachinski . | |
| 4,817,454 | 4/1989 | Schopf et al. . | |
| 4,817,455 | 4/1989 | Buxe . | |
| 4,879,792 | 11/1989 | O'Connor | 74/573 R X |
| 4,929,111 | 5/1990 | Lauritano | 403/258 X |

FOREIGN PATENT DOCUMENTS 849630 9/1952 Fed. Rep. of Germany ...... 403/243

OTHER PUBLICATIONS

Designing For Balance in Rotating Parts and Assemblies, Robert R. Zenk, Machine Design vol. 31 #11, May, 1959, pp. 102-109.

*Primary Examiner*—Rodney M. Lindsey
*Attorney, Agent, or Firm*—Jim Zegeer

[57] ABSTRACT

A flywheel capable of accommodating various automotive engines and transmission systems having different points of balance. The flywheel has a hub portion for securing to a crank shaft output arbor and a web portion integral with said hub portion on the periphery of said web portion and a weight is secured to the flywheel in such a way that the effective weight and effective position thereof is adjustable to a plurality of discrete positions, each of which is precisely correlated to each of the different points of balance of said various automotive engines having different points of balance, respectively. In a preferred embodiment, the weight is angularly and radially adjustable and is guided to each discrete position by at least one slot formed in the web, and a bolt passing through said weight and the slot. The bolts passing through the slots have safety attaching indentations therein for non-slip positive attachment of the weight in the different positions. An adaptor ring press is fitted within a hole in the hub for accommodating different output arbors of engine crank shafts and the adaptor ring and hub have cut-outs forming an elongated alignment slot for an alignment pin on the crank shaft arbor. A hole or aperture formed 180 degrees opposite the slots has an area of sufficient size as to provide a neutral balance condition when said weight means has been removed therefrom.

18 Claims, 9 Drawing Sheets

FLYWHEEL WITH ADJUSTABLE WEIGHTS

BACKGROUND OF THE INVENTION

The present invention relates primarily to flywheels, and more particularly, to flywheels which are balanced adjustable so that they may be adapted for use with a plurality of different automobile engines and, still more particularly, the invention is directed to replacement flywheels which can be adjusted to fit a plurality of different engines and thereby reduce parts inventories.

In heavy use, flywheels, particularly in heavy-duty vehicles such as light trucks, taxicabs and the like, can crack or break or the ring gear teeth can wear and must be replaced with a flywheel which is balanced for a given engine. In automotive vehicles, because of different engine designs, a weight is welded to the flywheel at different angular and radial positions on one surface thereof to compensate for any unbalance in a particular engine design. Because the position of this weight varies according to engine design, replacement flywheels must have the weight in precisely the same position for balancing the engine unbalance and, this requires a large inventory of replacement flywheels.

SUMMARY OF THE INVENTION

The present invention solves this problem by providing a flywheel in which the weight can be positioned at different radial and angular positions so that one flywheel can serve 15 to 20 different engine designs. In a preferred embodiment, the flywheel webs are provided with means for guiding the weight to distinct discrete positions where the weight may be secured, in the preferred embodiment, by bolt threadably engaged with the weight.

In a preferred embodiment, the guide means comprises one or more slots which are slanted relative to a radial line extending from the rotary axis towards the periphery of the flywheel. In the preferred embodiment, the flywheel webs are provided with a pair of slots which have a plurality of notches, with the slot connecting the notches so that the weight can be positioned in a plurality of different positions of radial and angular adjustment relative to the flywheel axis without removing the weight from the flywheel. The slots are balanced on the opposite sides of the flywheel by removal of metal sufficient to balance the flywheel so that with total removal of the weight and screws or bolts securing the weight to the flywheel, the flywheel is perfectly balanced.

Moreover, the arbor hole for receiving the end of the arbor on the engine crank shaft is provided with a removable reducer ring so as to accommodate different diameters of arbor shafts. Moreover, in this environment, there is constant vibration and stresses on the bolts holding the weight in position and it is possible that screws or bolts fastening or securing the weighted position on the flywheel could come loose. After mounting the weight and the bolts 41, 42 on the flywheel, the threads are damaged so that the bolts cannot be unthreaded without damaging the threaded bores for the bolts and preventing reuse if the bolts are removed from the weight. Other means may be utilized for preventing removal or unloosening of the bolt, for example, a metal-to-metal adhesive (such as an anerobic adhesive) can be used. Instead of notches, abutting surfaces of the weight and the web portions of the flywheel on each side of a slot may be provided with interfacing or complementary notches or ribs identifying specific locations and assuring proper positioning of the weight relative to the axis of the flywheel. In such case, the ribs are provided with indicia which can be collated or correlated to the balanced position for a given engine. In each embodiment, indicia may be printed or inscribed on the web and weight to identify particular engine types which are balanced by the weight at a particular location. Similar indicia can be screened or inscribed on the flywheel to indicate removal of the adaptor ring.

In the preferred embodiment disclosed herein, the flywheel is of the type used with automatic transmissions which includes a conventional torque converter which provides the basic inertia for the engine. While the preferred embodiment disclosed herein relates to flywheels for use with torque converters in an automatic transmission, it will be appreciated that the basic invention may also be applied to balancing internal combustion engines with manual transmissions wherein the flywheel may be a heavy iron or steel casting and includes a clutch mechanism associated therewith.

Accordingly, it is a basic object of this invention to provide an adjustable flywheel for automotive engines.

Another object of the invention is to provide an adjustable flywheel for automotive engines which eliminates the need for inventorying large numbers of different flywheels for different engine/transmission combinations.

Still another object of the invention is to provide a method of reducing the inventory requirement for replacement flywheels for various internal combustion engines having different points of balance wherein the flywheel is provided with one or more weights releasably fastened thereon and adjusting the weight by means of unfastening one or more weights so that the flywheel has points of balance corresponding to different points of balance of various internal combustion engines, respectively. Another object of the invention is to provide a replacement flywheel capable of accommodating various automotive engines having different points of balance wherein it is possible to adjust the flywheel to fit many engines. A further object of the invention is to provide a flywheel with a center adaptor to make it possible for the flywheel to fit many engines with different arbor diameters.

BRIEF DESCRIPTION OF THE DRAWINGS

The above and other objects, advantages and features of the invention will become more apparent when considered with the following specification and accompanying drawings wherein:

FIG. 7 is an enlarged sectional view through one of the bolt/fasteners showing the upsetting of the end thereof.

DETAILED DESCRIPTION OF THE INVENTION

Figure 1:
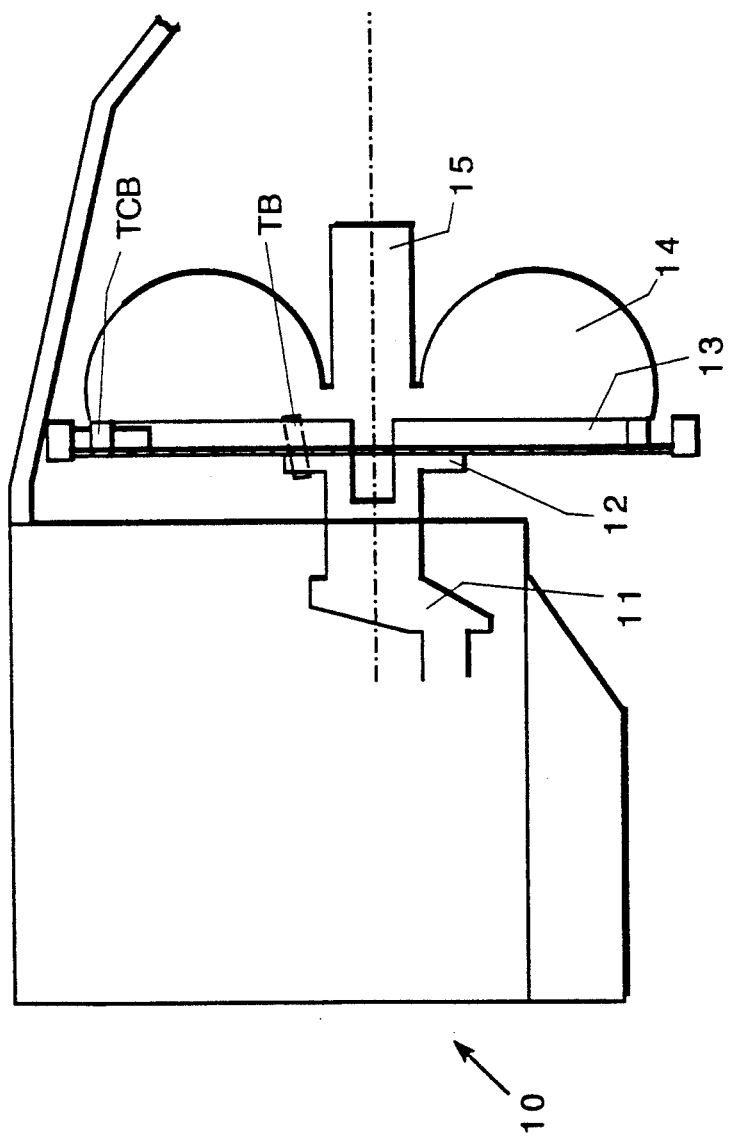
FIG. 1 is a schematic side elevation view of an internal combustion engine, flywheel and torque converter, incorporating the present invention.

Referring to FIG. 1, a typical engine flywheel transmission combination includes an engine 10 with a crank shaft 11 therein having an output arbor 12 bolted (TB) to flywheel 13 which, in turn, is bolted (TCB) to a torque converter 14 which has an output shaft 15 leading to the driven load. As diagrammatically illustrated in FIG. 3 the engine 10 is indicated as the crank shaft 16 of a 4-cylinder engine. The crank shaft is supported by main bearing journals 17 and 18 (there may be a timing gear wheel, not shown, connected to the end 18 of the crank shaft) and connecting rod bearing journals 19, are also provided. The crank shaft includes counter weights 20 which impede the centrifugal force of the connecting rod assembly attached to the bearing supports and ties together the reactions of the pistons and connecting rods transforming the reciprocating motion into rotary motion and transmits the engine power through the flywheel torque converter or transmission to the differential to drive a vehicle, for example.

As diagrammatically shown in FIG. 3, a weight W may be welded to the flywheel to compensate for an unbalance in a particular engine design. Of course, if the engine is well balanced, no weight is used. In all cases, when the flywheel must be replaced, it must be replaced with a flywheel which is balanced by a positionally located weight for a given engine and this position of balance may vary from engine-to-engine. Flywheels according to the present invention can be adapted to accommodate large numbers of different engines and thus reduce the expense of inventorying a large number of different flywheels for different engines.

Figure 2:
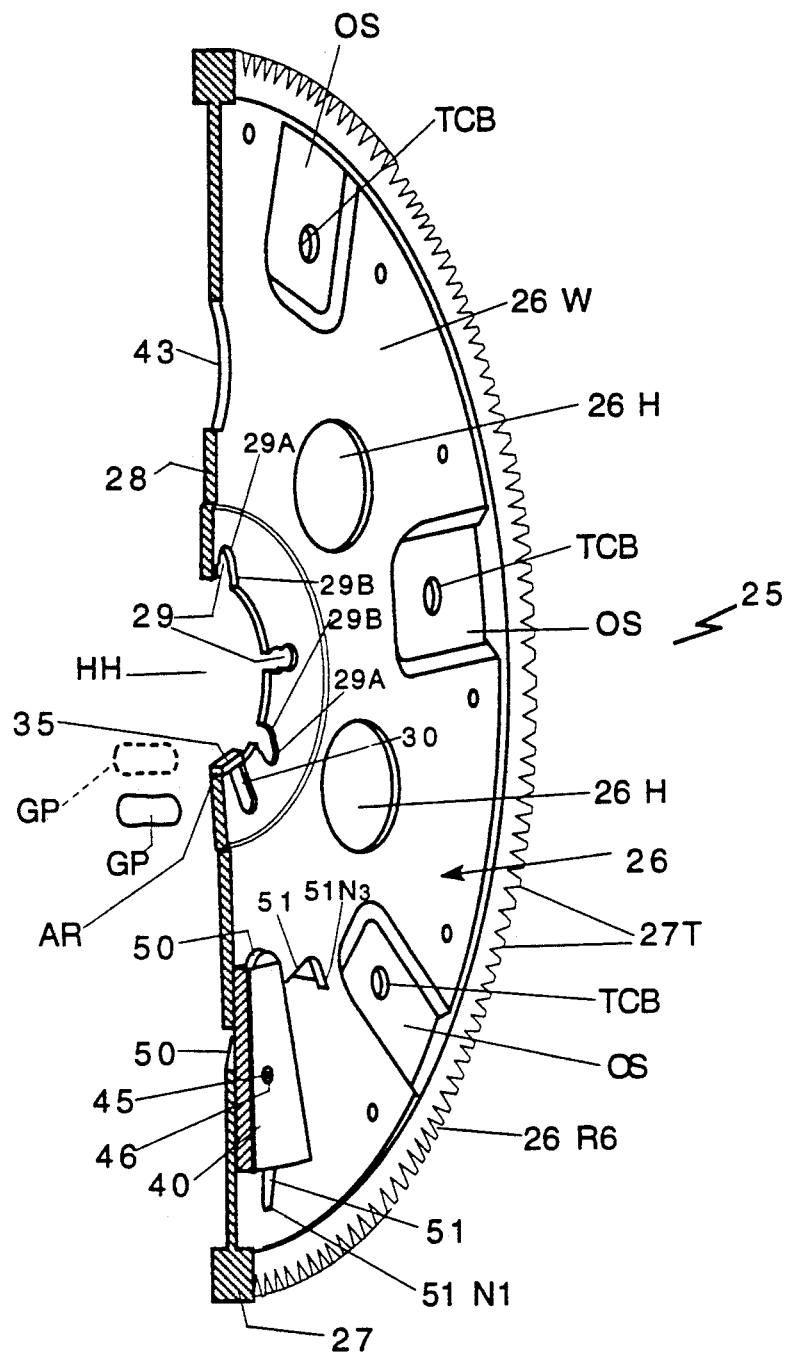
FIG. 2 is a sectional/isometric view of a flywheel incorporating the invention, FIG. 3A, B, C. . . N diagrammatically illustrates how the flywheel of the present invention is able to adapt and accommodate a plurality of different engines A, B, C. . . N.
Figure 3A:
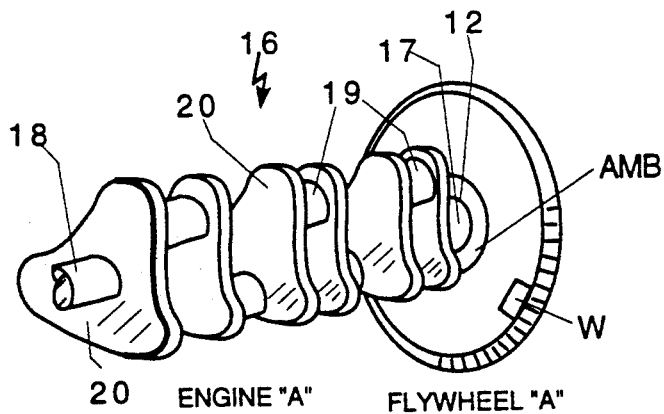
Figure 3B:
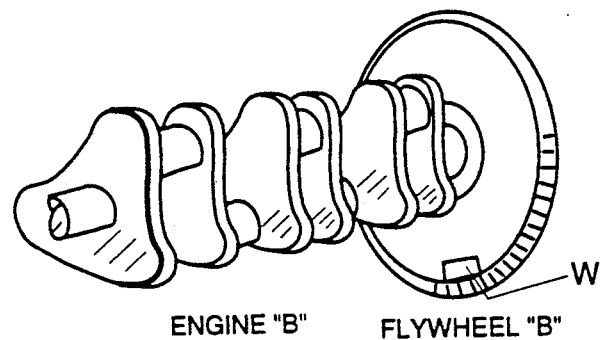
Figure 3C:
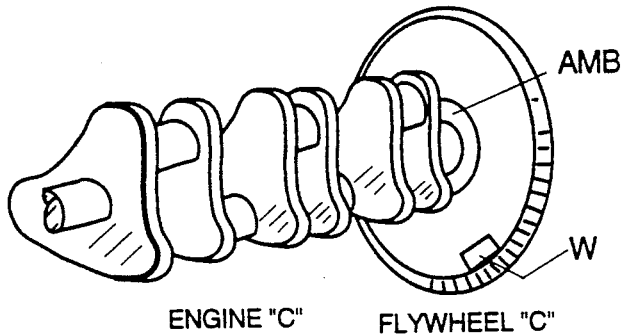
Figure 3N:
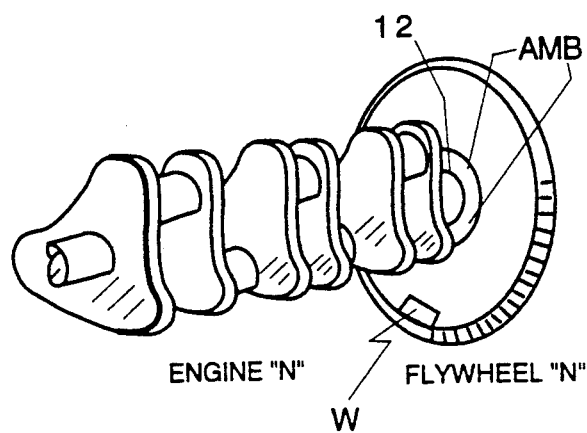
Figure 4:
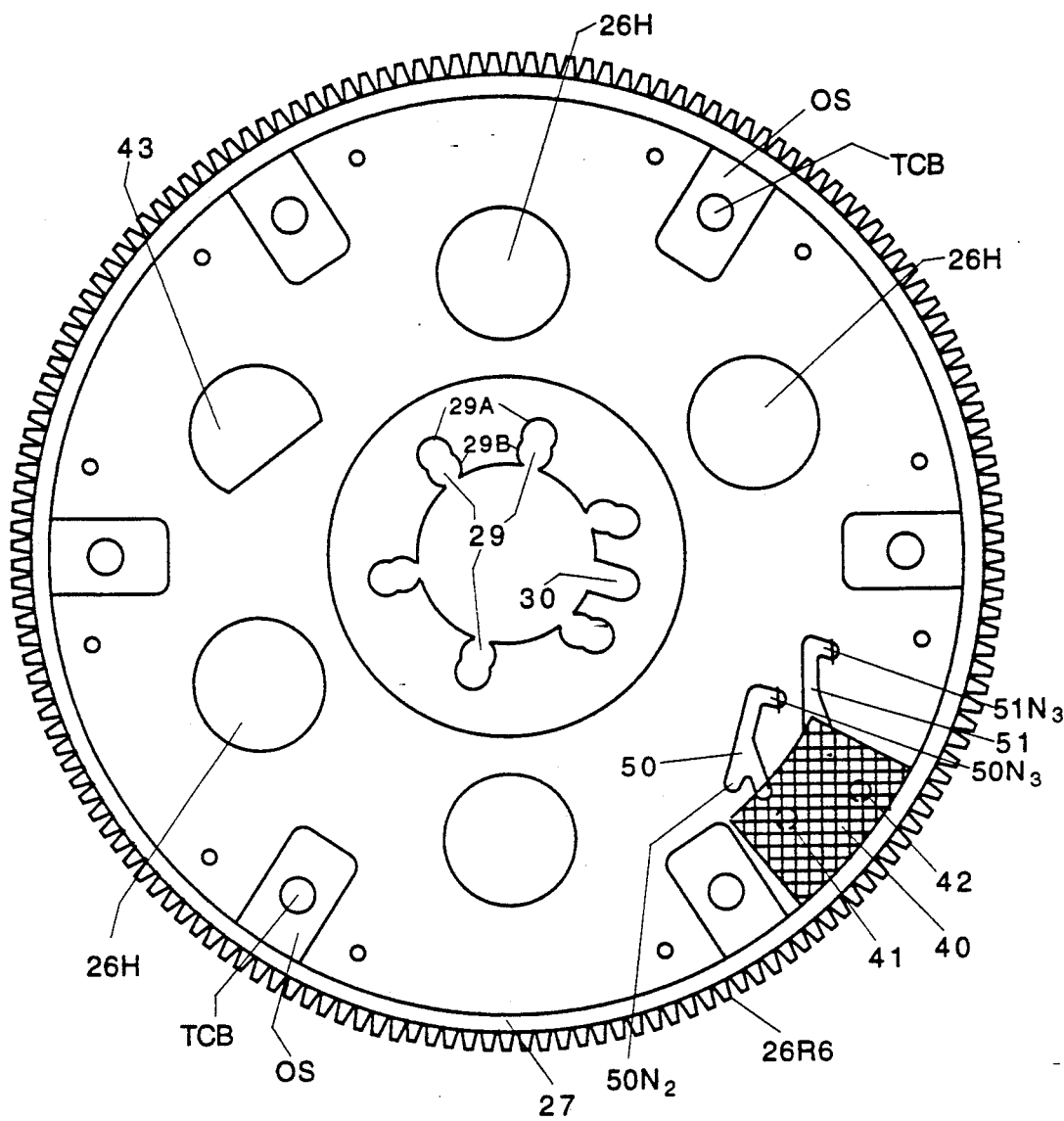
FIGS. 4 is a plan view of a flywheel incorporating the invention.
Figure 6:
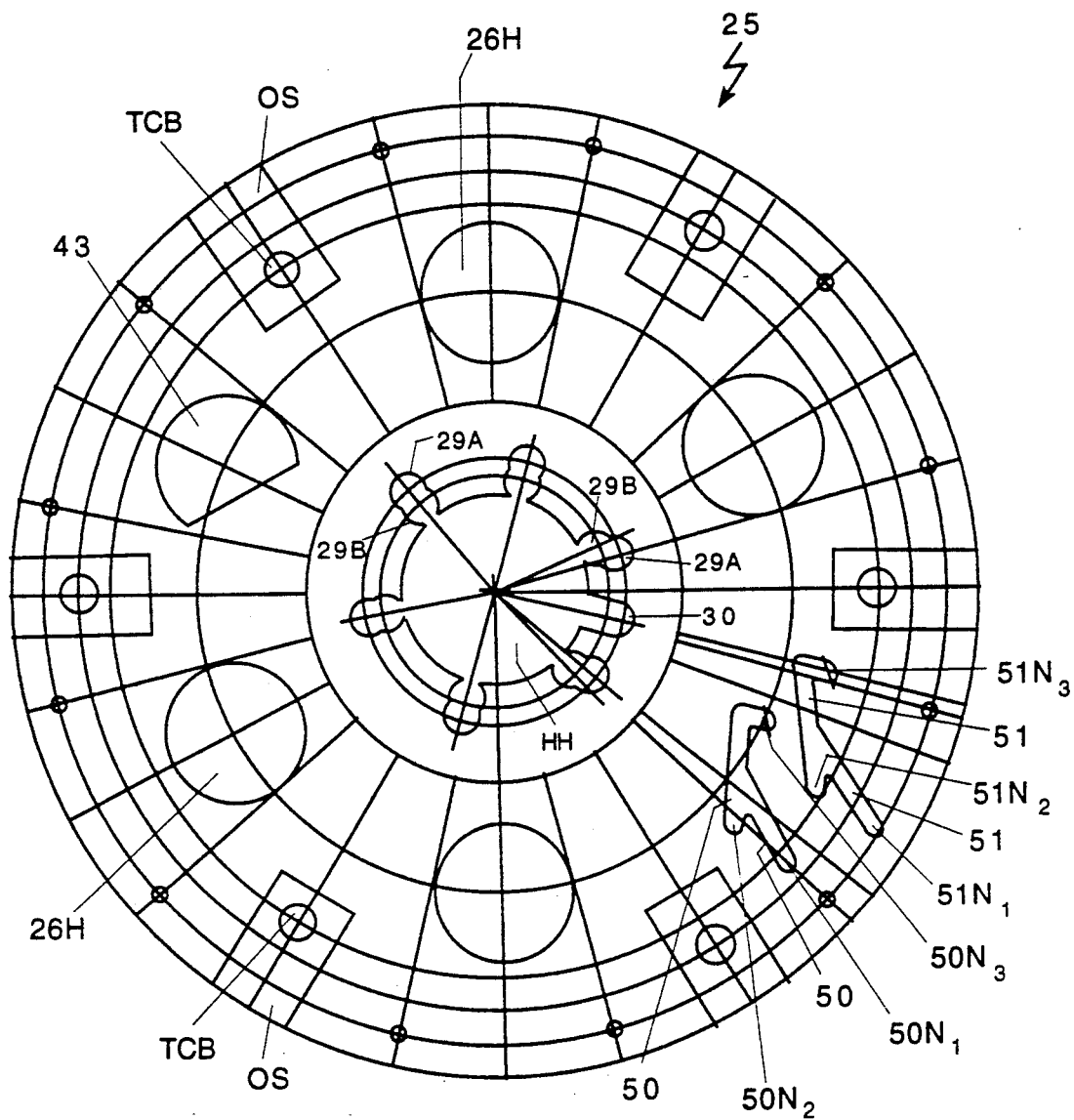
FIG. 6 is a diagrammatic illustration of the central hub and web portion of a flywheel incorporating the invention showing exemplary measurements thereon.

Referring now to FIGS. 2, 4 and 6, the flywheel 25 is constructed for use with an automobile internal combustion engine having an automatic transmission but it is to be understood that the invention is applicable to other engine configurations and to engines having a clutch. The flywheel 25 incorporates a central disk portion which is a round, relatively flat stamped metal plate having a hub portion 28 and a web portion 26. The engine side of the flywheel 25 is facing the viewer. A ring gear 27 is welded to the outer periphery of web 26, gear 27 having teeth 27T around its entire circumference which engage pinion gear teeth on a starting motor (not shown).

Hub portion 28 is provided for mounting the flywheel on the arbor end 12 (FIG. 1) of an engine using arbor mounting bolts AMB which pass through mounting bolt holes 29. Since the crank shaft arbors may have different mounting bolt positions, overlapping holes 29a, 29b provide for attachment to a wide range of engine arbors.

In addition, typically an engine crank shaft arbor may have a guide pin, diagrammatically illustrated at GP, which may likewise vary for different engines and an elongated slot 30 is provided to accommodate different engine guide pins GP.

Engine crank shaft arbors may vary in diameter and to accommodate different diameters, an adaptor ring 35 is press-fitted within hub hole HH and may be removed to accommodate different output arbors of engine crank shafts. As shown in FIG. 2, the adaptor ring 35 has a small flange or rim AR which prevents it from being pushed through arbor hole HH. As shown in FIG. 4, the end of slot 34 is extended into the outer periphery of adaptor ring 35 to accommodate, for example, a arbor-orienting pin GP, shown in dotted in FIG. 2. The web 26W and hub 28 are made of a mild carbon steel stamping and a hardened steel ring gear 27 is welded to the periphery of the web 26.

Large diameter holes 26H provide access, and the securement of the web to the torque converter is by means of bolts TCB passing through holes TCB in offsets OS, the torque converter being located on the opposite side of the flywheel as depicted in FIG. 2.

A weight 40 is adjustably secured to the flywheel web and is adjustable to different angular and radial positions on one surface thereof to compensate for any unbalance in a particular engine design. As shown in FIG. 7, hex head bolts 41 (and 42) pass from the torque converter side towards the engine side and are threadably engaged with threaded bores 40TB in the weight 40. As best shown in FIG. 6, a pair of guide slots 50 and 51 are formed in web 26 during the stamping thereof and guide a pair of hex head bolts 41, 42 to precisely position weight 40 in a plurality of different positions of radial and angular adjustment relative to the rotary axis of the flywheel. These slots 41 and 42 are balanced on the opposite side of the flywheel by an aperture 43 in which sufficient metal is removed to balance the metal removed to form the slots so that upon total removal of the weight 40 and the bolts 41, 42 securing the weight to the flywheel, the flywheel is perfectly balanced (see FIG. 5N).

As shown in FIG. 7, hex head bolt 41 has the outer end thereof indented and/or otherwise upset as at 45 to cause the lateral circumference circumferential edges thereof 46 to flare outwardly to prevent removal of the bolt 41 without damaging the threads in threaded bore 40TB. This is a safety feature in two senses: In this environment there is constant engine vibration and stresses on the bolts holding the weight in position and is possible for these bolts fastening or securing the weight in the predetermined position on the flywheel could come loose after a period of time and the mounting weight and the threads being upset to prevent them from becoming loose. It also prevents the mechanic from removing and reattaching the weight or a different weight unless it is desired to totally remove the weight from the flywheel to balance the flywheel per se.

As shown in FIG. 6, the end positions of slots 50 and 51, forming notches 50N1 and 51N1, define one position of adjustment for the weight, notches 50N2 and 51N2 define a second position of adjustment which is both radially and angularly different from the position 50N1, 51N1 and, similarly; and notches 50N3 and 51N3 define a further position of adjustment. It will be obvious that a larger or smaller number of positions can be used than the three illustrated (see in FIG. 8, for example). These combinations of positions of adjustment, with the arbor adjustments discussed earlier herein allow this embodiment of the flywheel to accommodate a multitude of different engines with different positions of balance thereby reducing the inventory requirements of parts suppliers. In addition, it allows original equipment manufacturers to provide one flywheel design which can accommodate a large number of different engine designs thereby simplifying their production requirements and improving efficiency and reducing costs.

Figure 5:
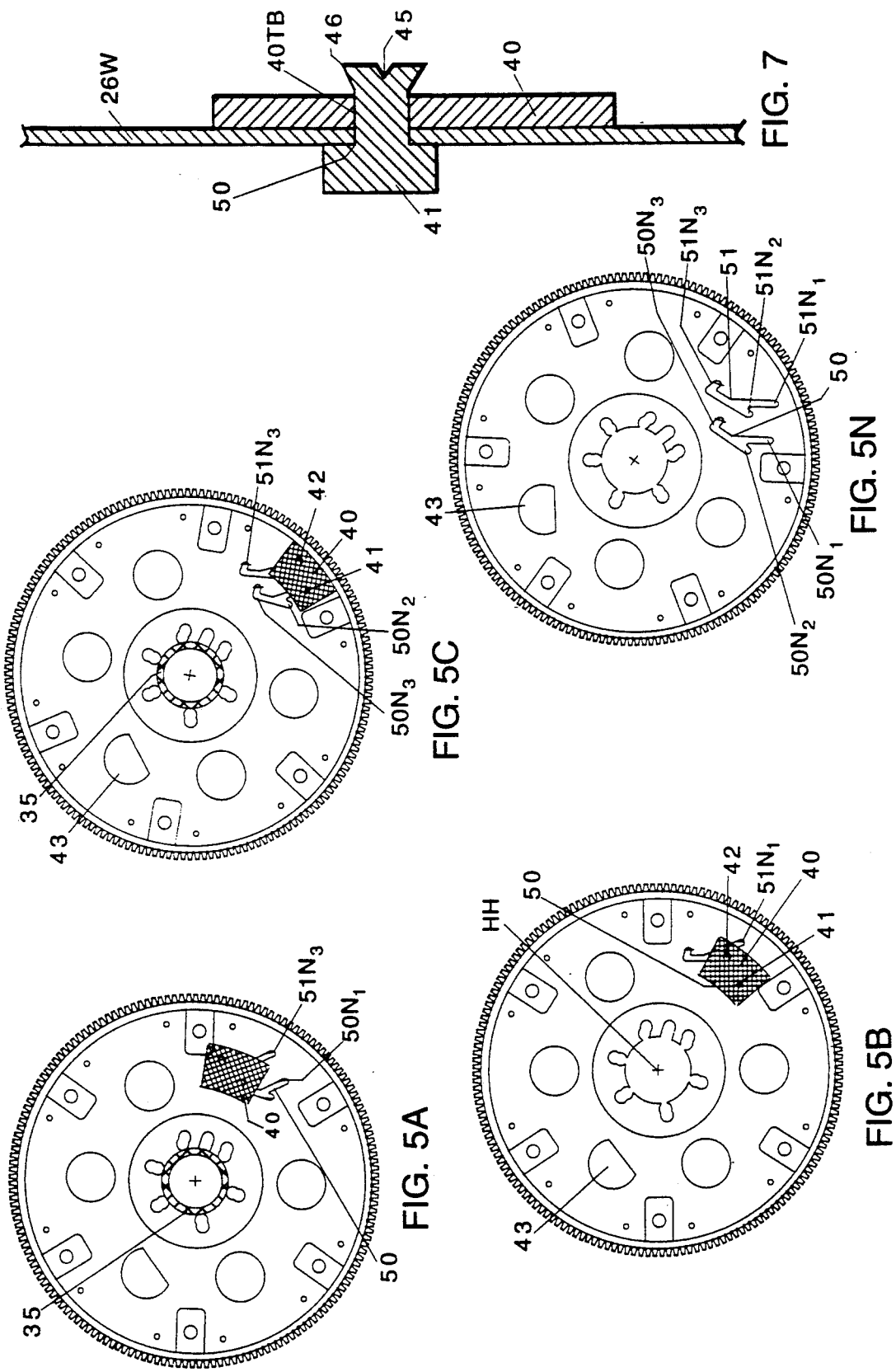
FIGS. 5A, B, C,. . . N illustrate various discrete positions of adjustment of the removal of the annular knockout to accommodate various engines.

Referring to FIG. 5, four exemplary engine balance conditions are shown. In FIG. 5A, the arbor adaptor ring 35 is in place and weight 40 is bolted in place in slot notches 50N3 and 51N3. In FIG. 5B, the arbor adaptor 35 has been removed and the weight secured or bolted in a position defined or located by slot notches 50N2 and 41N2. In FIG. 5C, the arbor adaptor is in place and the weight 40 is bolted in the position defined by the bolt shafts in slot notches 50N1 and 51N1. Note the angular and radial positions of the weight 40. In FIG. 5N, the weight and the bolts have been removed and the flywheel is perfectly balanced.

It will be appreciated that in addition to bolting the weight at the different positions, a metal-to-metal adhesive such as an anerobic adhesive may be utilized to or in addition to the bolt.

It will be appreciated that if the safety feature described above in connection with the upsetting the end of the fastening bolts is not desired, this may be eliminated.

Figure 9B:
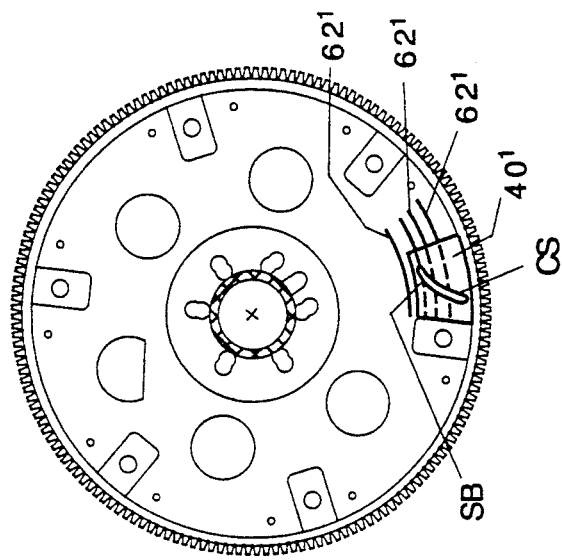
FIG. 9B is a plan view showing the guide slot in the weight.
Figure 9A:
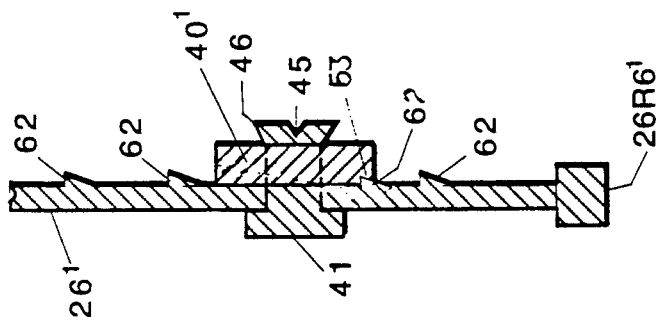
FIG. 9A is a sectional view of a further embodiment of the invention.
Figure 8:
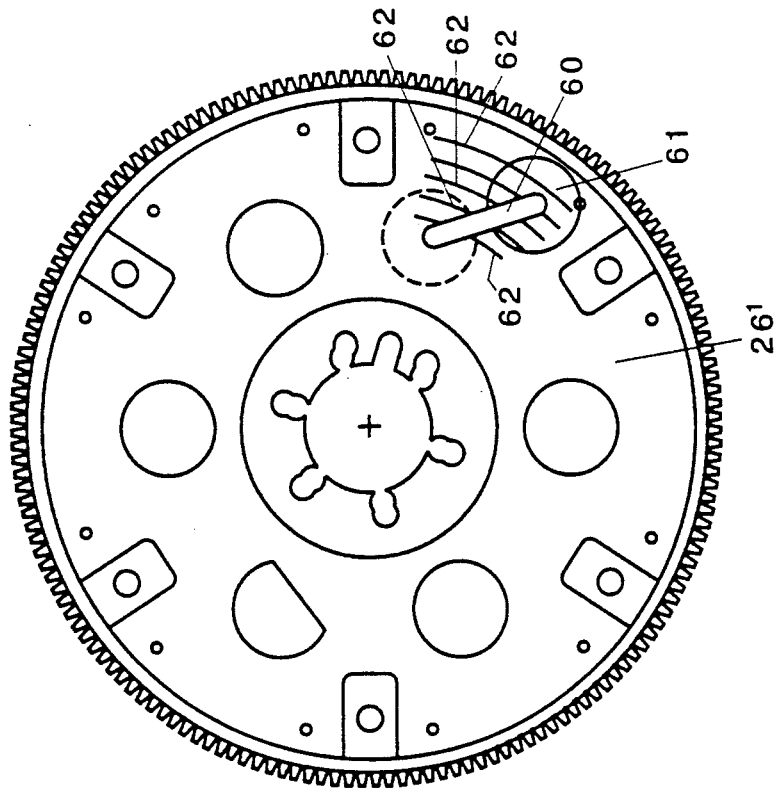
FIG. 8 is a modification of the preferred embodiment.
Figure 9C:
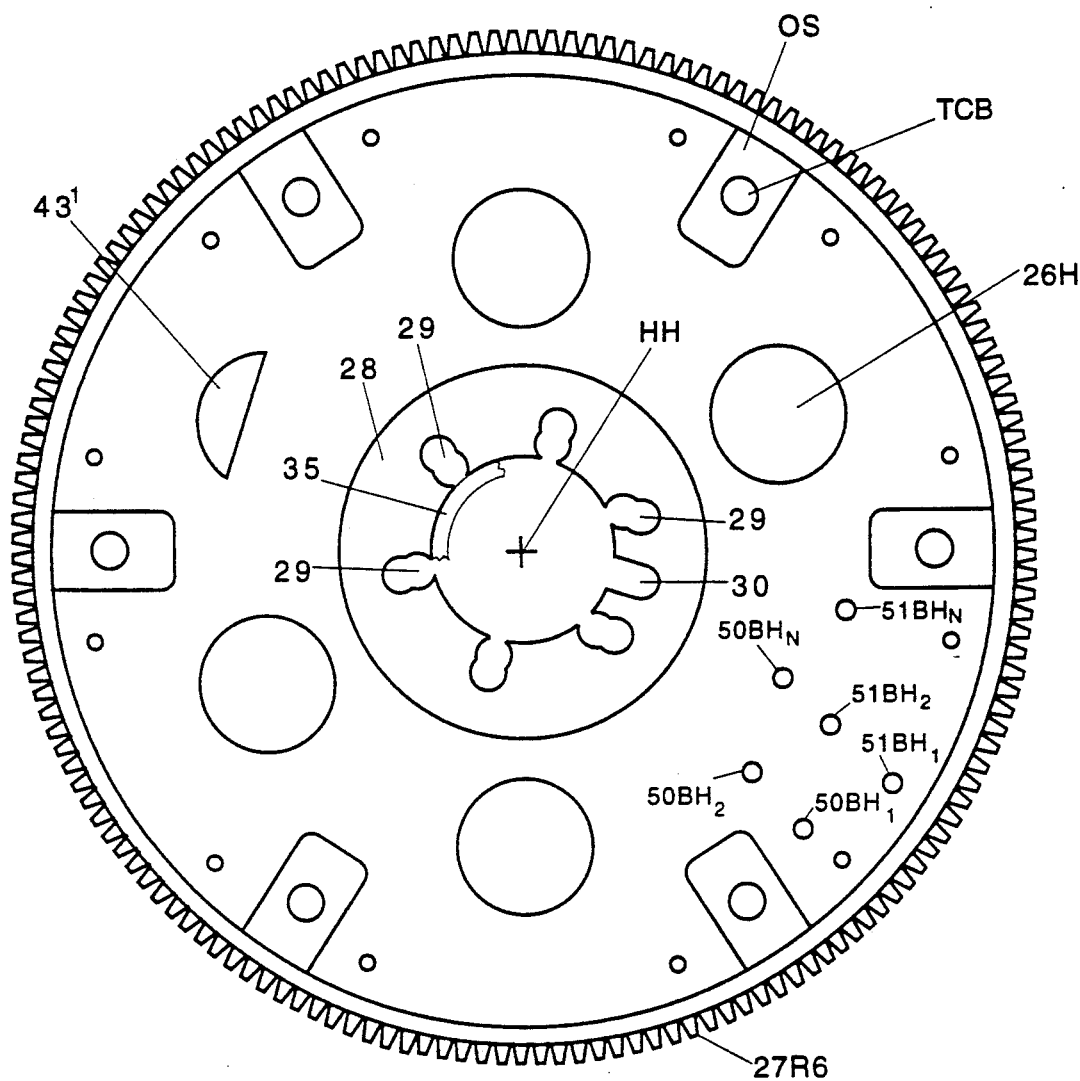
FIG. 9C is an embodiment of the invention wherein the discrete weight positions are defined by bolt holes.

As diagrammatically illustrated in FIG. 8, a single slot 60 may be utilized in conjunction with means for defining precise positions along the slot 60 for precisely positioning the weight at different positions of radial and angular adjustment. In this case, a round or circular weight 61 is utilized and annular ribs or grooves 62 formed in the web 26' and complementary grooves 63 in the weight 40' (see FIG. 9A) provide positive locking of the weight in the different positions of adjustment. It will be appreciated that the slot may be a radially extending slot in which case no angular adjustment is incorporated into the weight. Moreover, as shown in FIG. 9B, the slot CS can be curved and formed in the weight 40' and with a securement bolt SB, having the ends upset in the manner illustrated in FIG. 7, will be threadably engaged with a threaded bore hole in the web of the flywheel 26'. In the embodiment illustrated in FIG. 9C, the discrete positions are defined by the bolt holes 50BH-1-51BH1, 50BH-2-51BH2 and 50BH-51BH. In this case, the ends of the bolts may be upset after they have been threaded through the weight.

Figure 10A:
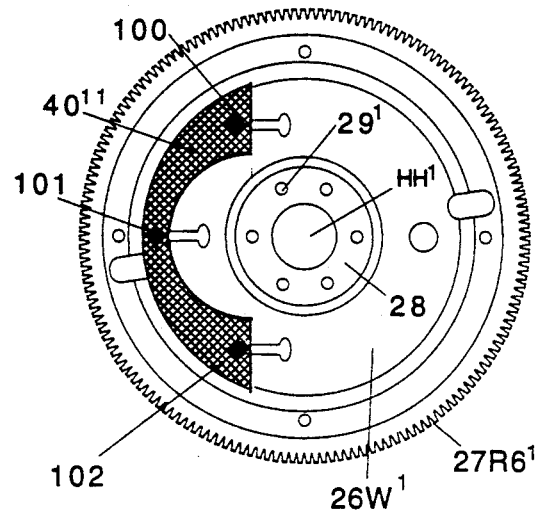
FIGS. 10A, 10B, 10C and 10D illustrate a further embodiment of the invention wherein the weight is crescent or moon-shaped and there are three guide slots.
Figure 10D:
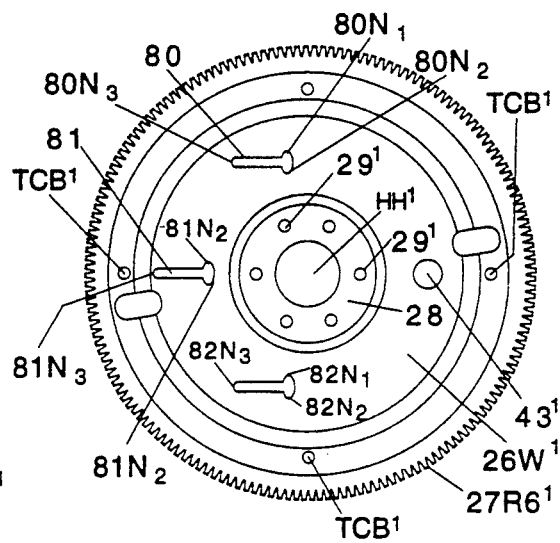
Figure 10B:
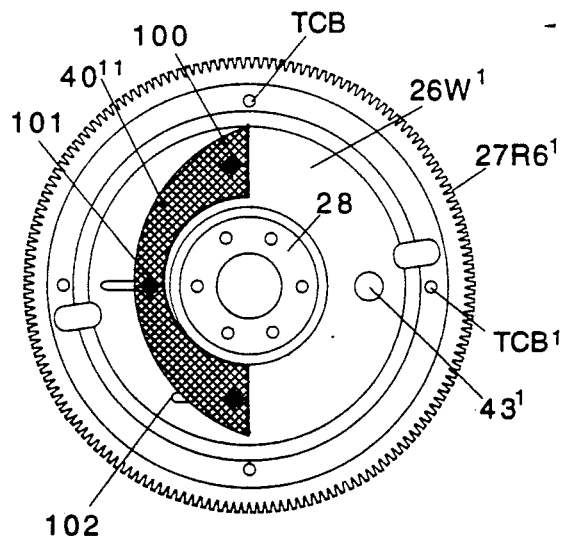
Figure 10C:
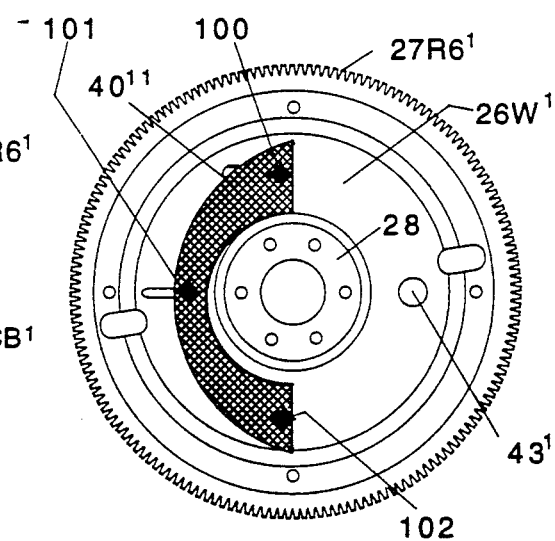

In the embodiment shown in FIG. 10A, B, C and D, which is particularly adopted for Ford-type engines, the weight 40" is crescent or moon-shaped and web 26W' has three guide slots 80, 81 and 82, which interconnect discrete notch positions 80N1, 80N2 and 80N3, 81N1, 81N2 and 81N3, and 82N1, 82N2 and 82N3, respectively and, which guide three bolts 100, 101 and 102 to the respective notch positions. As in the embodiment shown in FIG. 9C, the discrete positions can be established by bolt holes without the slots interconnecting same. Numerals corresponding to previously discussed features are primed. In FIG. 4D, the weight 40" has been removed and is perfectly balanced. In FIG. 4A, weight 40" has been moved radically outwardly to the position defined by notches (or bolt holes) 80N3, 81N3 and 82N3. In FIGS. 10C and 10D, the weight has been angularly shifted to positions defined by notches 80N1, 82N1 or 80N2, 81N2 and is located inwardly of the rotary axis.

It will be noted that the weight in the preferred embodiment has an outer periphery that has a curvature that is precisely the same as the curvature of the inside rim of the ring gear RG.

While there has been shown and described a preferred embodiment of the invention, it will be appreciated that various modifications and adaptations and variations of the invention can be made without departing from the spirit and scope thereof and it is intended to encompass such obvious modifications and adaptations as come within the scope of the accompanying claims.

What is claimed is:

1. A flywheel assembly capable of accommodating various automotive engines and transmission systems having different points of balance and a crank shaft output arbor, comprising:
   a hub portion for securing to said crank shaft output arbor and a web portion integral with said hub portion on the periphery of said web portion and structural means on said web defining a plurality of discrete balance positions, and
   a weight means,
   means securing said weight means to said flywheel in such a way that the effective weight and effective position thereof is adjustable to said plurality of discrete positions, each of said discrete balance positions being precisely correlated to each of said different points of balance of said various automotive engines having different points of balance, respectively.

2. The flywheel assembly defined in claim 1 wherein said flywheel has a rotary axis and said weight means is angularly and radially adjustable relative to the said rotary axis of said flywheel.

3. The flywheel assembly defined in claim 1 wherein said means securing said weight means to said flywheel includes at least one slot formed in said web portion, and
   a bolt passing through said weight means and said slot, said slot having said plurality of discrete positions of adjustment and means for positively retaining said weight means in each one of said discrete positions of adjustment.

4. The flywheel assembly defined in claim 3 wherein there are a plurality of said slots and at least one bolt for each slot.

5. The flywheel assembly defined in claim 4 wherein said bolts passing through said slots have safety attaching indentations therein for non-slip positive attachment of said weight in said different positions.

6. The flywheel assembly defined in claim 1 wherein said hub means has a hole therein and an adaptor ring press fitted within said hole for accommodating different output arbors of engine crank shafts.

7. The flywheel assembly defined in claim 6 wherein said adaptor ring and hub have cut-outs forming an elongated alignment slot in said hub.

8. The flywheel assembly defined in claim 1 wherein there are a plurality of bolt mounting holes in said hub portion, each of said bolt mounting holes being constituted by overlapping circular cut-outs to permit said mounting holes to accommodate different sizes of crank shaft output arbors, respectively.

9. The flywheel assembly defined in claim 3 including a hole formed 180 degrees opposite said slot means, said hole having an area of sufficient size as to provide a neutral balance condition when said weight means has been removed therefrom.

10. A replacement flywheel assembly capable of accommodating various automotive engines having different points of balance and a crank shaft with an output arbor thereon, comprising:
   a flywheel having a hub portion for securing to a crank shaft output arbor and a web portion integral with said hub portion and a ring gear on the periphery of the web portion and structural means on said web defining a plurality of discrete balance positions, and
   a weight means,
   menas securing said weight means to said flywheel in such a way that the effective weight and effective angular position thereof is adjustable to a plurality of discrete positions, each said discrete position being precisely correlated to each of said different points of balance of said various automotive engines having different points of balance, respectively.

11. The replacement flywheel assembly defined in claim 10 wherein said means securing said weight means to said flywheel includes at least one slot formed in said web, and
   a bolt means passing through said weight means an in said slot, said slot having said plurality of discrete positions for positively retaining said bolt therein.

12. The replacement flywheel assembly defined in claim 10 wherein there are a plurality of said slots.

13. The replacement flywheel assembly defined in claim 11 wherein said bolt passing through said slot have safety attaching indentations therein for non-slip positive attachment of said weight means in said different positions.

14. The replacement flywheel assembly defined in claim 10 wherein said hub portion has a hole therein and an adaptor ring press fitted within said hole for accommodating different styles of engine crank shafts.

15. The replacement flywheel assembly defined in claim 11 including a hole or aperture formed 180 degrees opposite said at least one slot, said hole having an area sufficient to provide a neutral balance condition when said weight has been removed.

16. The replacement flywheel assembly defined in claim 13 including a hole or aperture formed 180 degrees opposite said slot means, said hole having an area of sufficient such as to provide a neutral balance condition when said weight has been removed.

17. A replacement flywheel adaptable to various internal combustion engines having a crankshaft output arbor and different points of balance for each internal combustion engine comprising, in combination, a flywheel having an arbor mounting hub, a web, at least one weight releasably fastened on said web, and a selectively removable press fit arbor ring in said arbor mounting hub to adapt said arbor mounting hub for each said various internal combustion engine according to the diameter of the crankshaft output arbor of each said various internal combustion engines, respectively.

18. The replacement flywheel defined in claim 17 wherein said web has a side surface, said press fit arbor ring includes an annular flange bearing on said side surface.

* * * * *